US008277061B2

(12) United States Patent
Yang et al.

(10) Patent No.: US 8,277,061 B2
(45) Date of Patent: Oct. 2, 2012

(54) LIGHT GUIDING MECHANISM FOR PORTABLE ELECTRONIC DEVICE

(75) Inventors: Mu-Wen Yang, Taipei (TW); Chih-Chiang Chang, Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 436 days.

(21) Appl. No.: 12/750,837

(22) Filed: Mar. 31, 2010

(65) Prior Publication Data

US 2010/0284183 A1 Nov. 11, 2010

(51) Int. Cl.
*G01D 11/28* (2006.01)

(52) U.S. Cl. ........................ 362/23; 362/30; 362/249.02

(58) Field of Classification Search .................. 362/235, 362/543–549, 555, 800, 249.01–249.03, 362/24, 88, 292, 23
See application file for complete search history.

(56) References Cited

U.S. PATENT DOCUMENTS

2008/0117618 A1* 5/2008 Chen .............................. 362/24

* cited by examiner

*Primary Examiner* — Mariceli Santiago
*Assistant Examiner* — Donald Raleigh
(74) *Attorney, Agent, or Firm* — Altis Law Group, Inc.

(57) ABSTRACT

A light guiding mechanism for portable electronic device includes a cover, a light guiding module and four light sources. The cover includes a light transmitting region. The light guiding module includes a light guide plate having a first diagonal line and a second diagonal line. The light guide plate defines a first through hole. The light guide plate includes a light reflecting region around the first through hole. The light reflecting region includes a plurality of protrusions symmetrically positioned relative to the first diagonal line and the second diagonal line. Adjacent protrusions have a space therebetween. The size of the space uniformly increases with increasing distance from the first through hole. Light emitted from the light sources is repeatedly reflected by the protrusions and then passes the light transmitting region of the cover.

20 Claims, 5 Drawing Sheets

V
42
3132
313
3131
14
23
21
13
12
V

LIGHT GUIDING MECHANISM FOR PORTABLE ELECTRONIC DEVICE

BACKGROUND

1. Technical Field

The present disclosure relates to portable electronic devices, particularly, to a light guiding mechanism for use in a portable electronic device.

2. Description of Related Art

Portable electronic devices generally apply electroluminescence panels or light emitting diodes as light sources to improve general overall appeal and attractiveness. However, light intensity becomes weaker with increasing distance from the light sources and the volume and quantity of the light sources in the portable electronic device are limited. Thus, light intensity of the portable electronic device is not uniform.

Therefore, there is room for improvement within the art.

BRIEF DESCRIPTION OF THE DRAWINGS

Many aspects of the portable electronic device can be better understood with reference to the following drawings. The components in the drawings are not necessarily drawn to scale, the emphasis instead being placed upon clearly illustrating the principles of the portable electronic device, in which.

DETAILED DESCRIPTION

Figure 1:
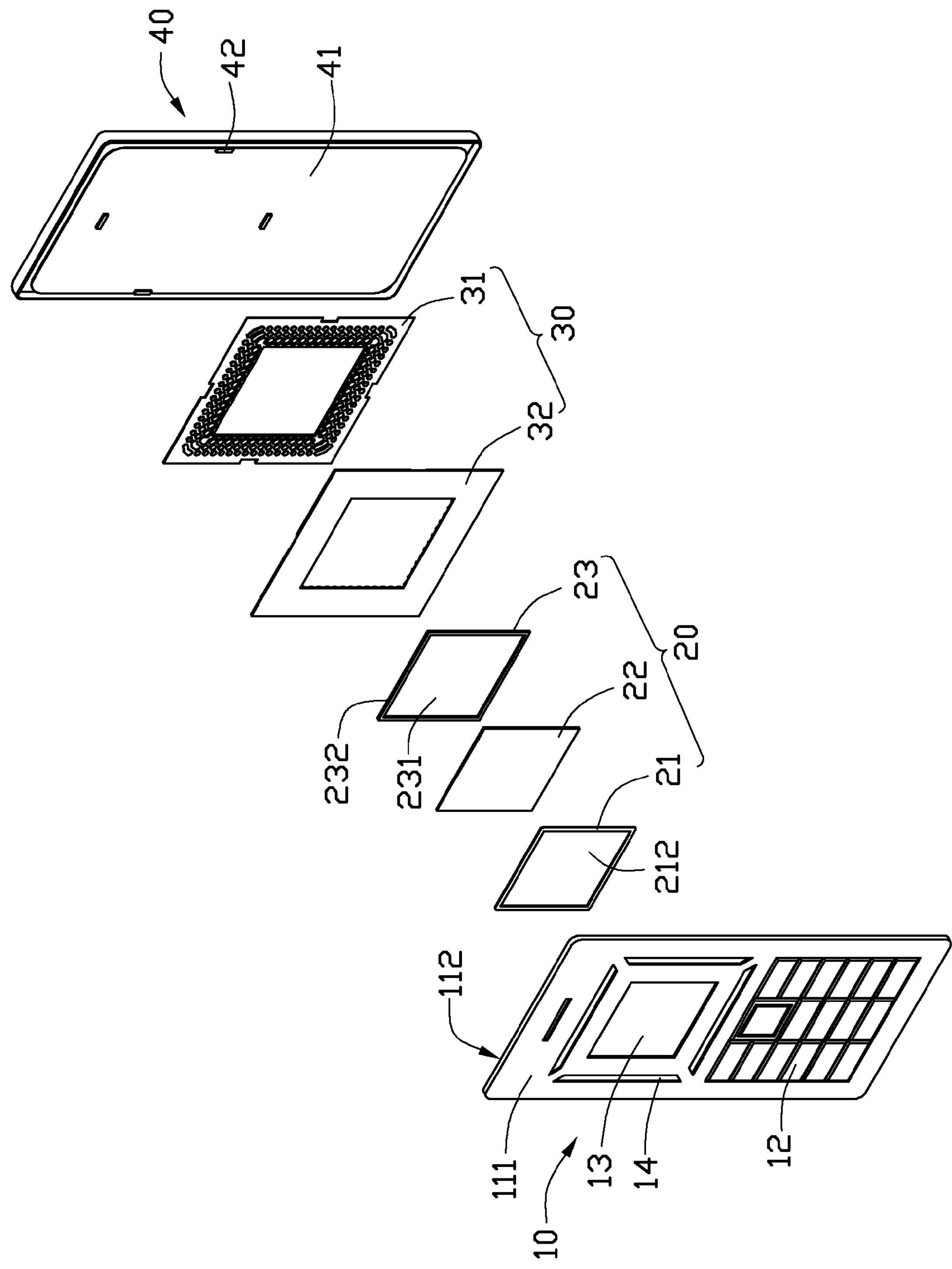
FIG. 1 is an exploded, schematic view of a portable electronic device incorporating with a light guiding mechanism, in accordance with an exemplary embodiment.

FIG. 1 shows an exemplary embodiment of a portable electronic device 100 incorporating with a light guiding mechanism (not labeled). The portable electronic device 100 includes a cover 10, a display module 20, a light guiding module 30 and a main body 40.

The cover 10 includes an outer surface 111 and an inner surface 112. An input key portion 12 is set in the outer surface 111. The cover 10 defines a display window 13 and a plurality of apertures 14 through the outer surface 111 and the inner surface 112. The apertures 14 are positioned adjacent to the display window 13 to form a light transmitting region (not labeled). In this embodiment, the number of the apertures 14 is four, and the four apertures 14 forms a discontinuous square.

The display module 20 includes a gasket 21, a display 22 and a fixing member 23. The gasket 21 defines a light hole 212 corresponding to the display window 13. The size of the display 22 is similar to the gasket 21. The fixing member 23 includes a base plate 231 and a flange 232. The flange 232 surrounds the base plate 231, for receiving the display 22.

Figure 2:
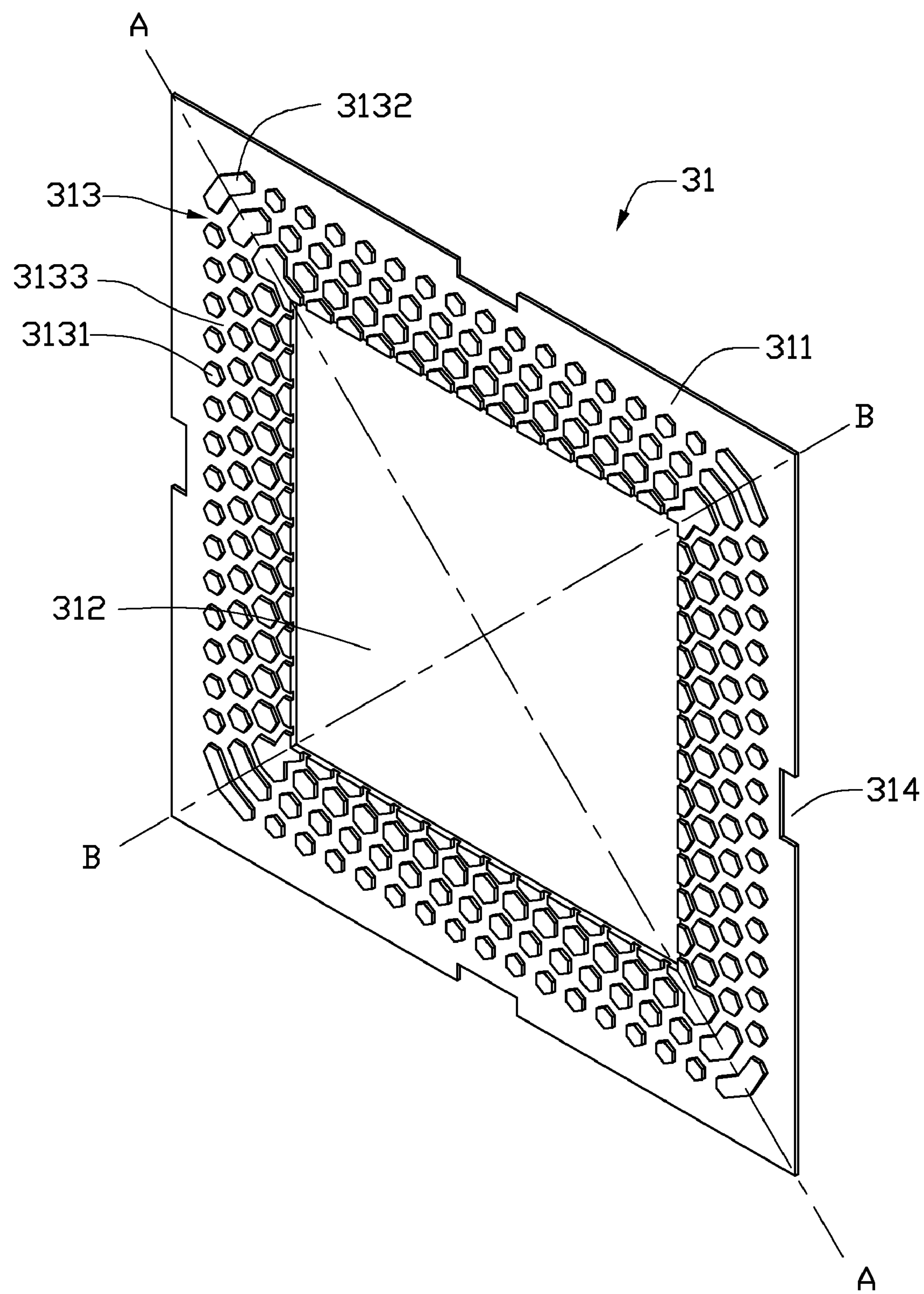
FIG. 2 is a schematic view of a light guide plate shown in FIG. 1.

The light guiding module 30 includes a light guide plate 31 and a transparent film 32. Referring to FIG. 2, the light guide plate 31 includes an optical surface 311 and defines a first through hole 312 for receiving the fixing member 23. A first diagonal line A-A and a second diagonal line B-B are defined on the optical surface 311. The first diagonal line A-A and the second diagonal line B-B are orthogonal to each other. A light reflecting region 313 is formed on the optical surface 311. The light reflecting region 313 includes a plurality of first protrusions 3131 and second protrusions 3132. The protrusions 3131, 3132 are symmetrically positioned relative to the first diagonal line A-A and the second diagonal line B-B. Each first protrusion 3131 is substantially a hexagonal having three pairs of parallel edges (not labeled). The second protrusions 3132 lie on the first diagonal line A-A and the second diagonal line B-B, and have edges correspondingly parallel to facing edges of adjacent protrusions 3131, 3132. Adjacent protrusions 3131, 3132 are separated from each other, defining a space 3133. The size of the protrusions 3131 uniformly decreases with increasing distance from the first through hole 312. Consequently, the size of the space 3133 uniformly increases with increasing distance from the first through hole 312. The second protrusions 3132 are shaped according to the adjacent first protrusions 3131 and the space 3133. The light guide plate 31 defines four cutouts 314 at four edges thereof. Each of the cutouts 314 is positioned at a half way of the length of a corresponding edge of the light guide plate 31, for receiving light source.

Figure 3:
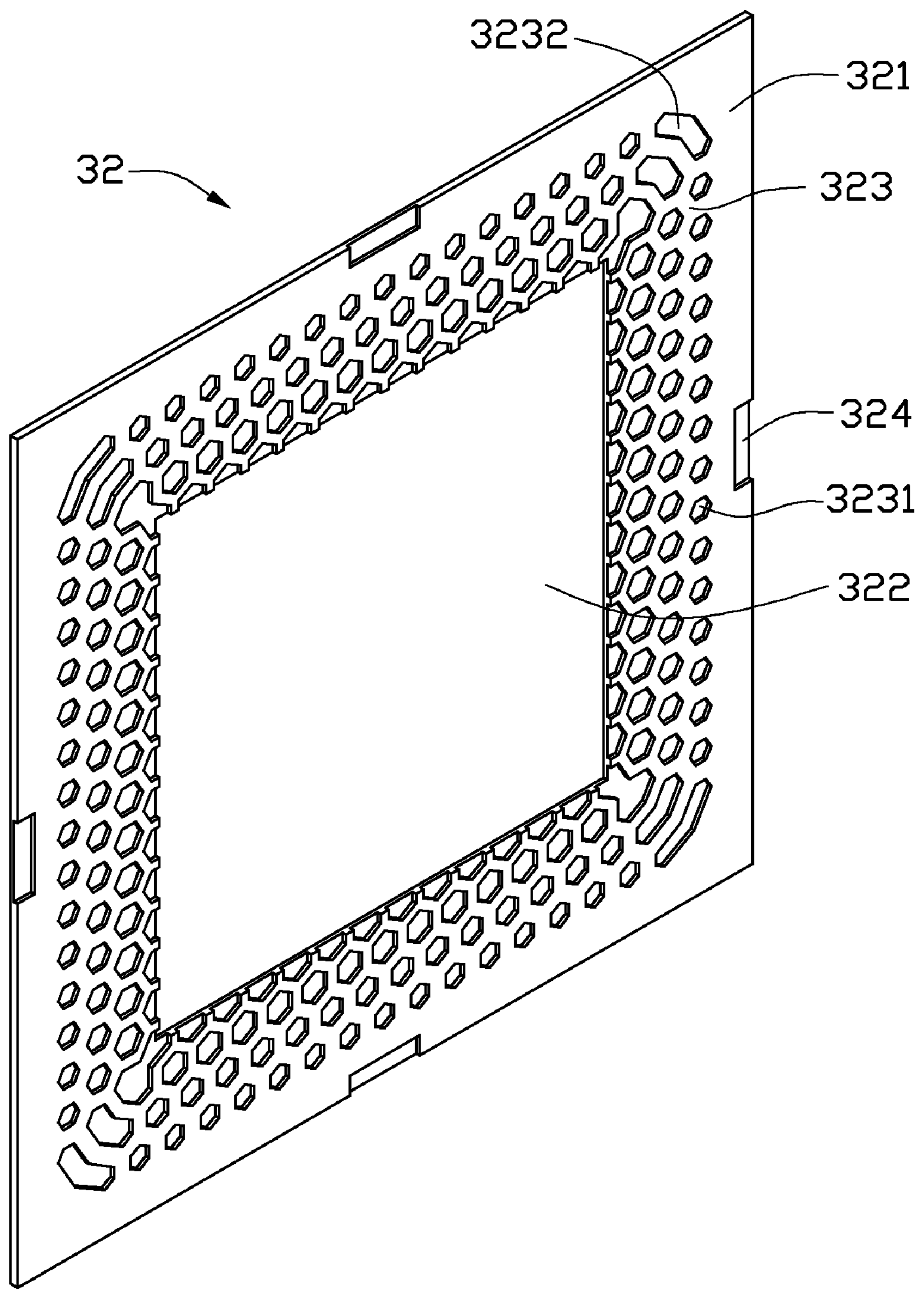
FIG. 3 is a schematic view of a transparent film shown in FIG. 1.

Referring to FIG. 3, the transparent film 32 has a similar size corresponding to the light guide plate 31, and includes a flat surface 321. The transparent film 32 defines a second through hole 322 and four notches 324 in the flat surface 321 corresponding to the first through hole 312 and the cutouts 314. A receiving region 323 is formed in the flat surface 321 and defines a plurality of first grooves 3231 and second grooves 3232. The first grooves 3231 are correspondingly configured for partially receiving the first protrusions 3131, and the second grooves 3232 are correspondingly configured for partially receiving the second protrusions 3232.

The main body 40 includes a printed circuit board 41 and four light sources 42 are spacely set on the printed circuit board 41. Each pair of the light sources 42 faces with each other. In this embodiment, the light sources 42 are light emitting diodes.

Figure 4:
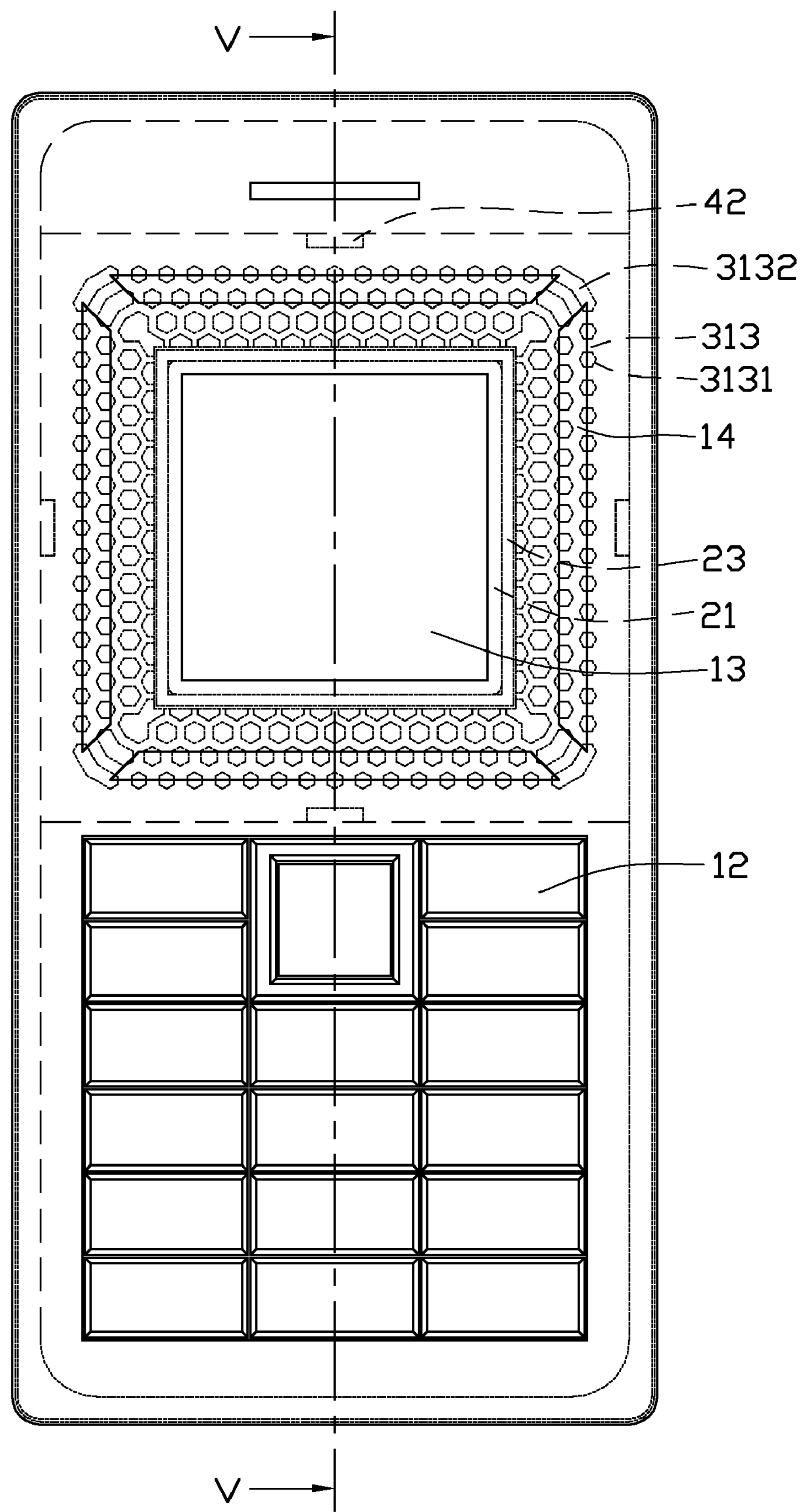
FIG. 4 is an assembled, schematic view of the portable electronic device.
Figure 5:
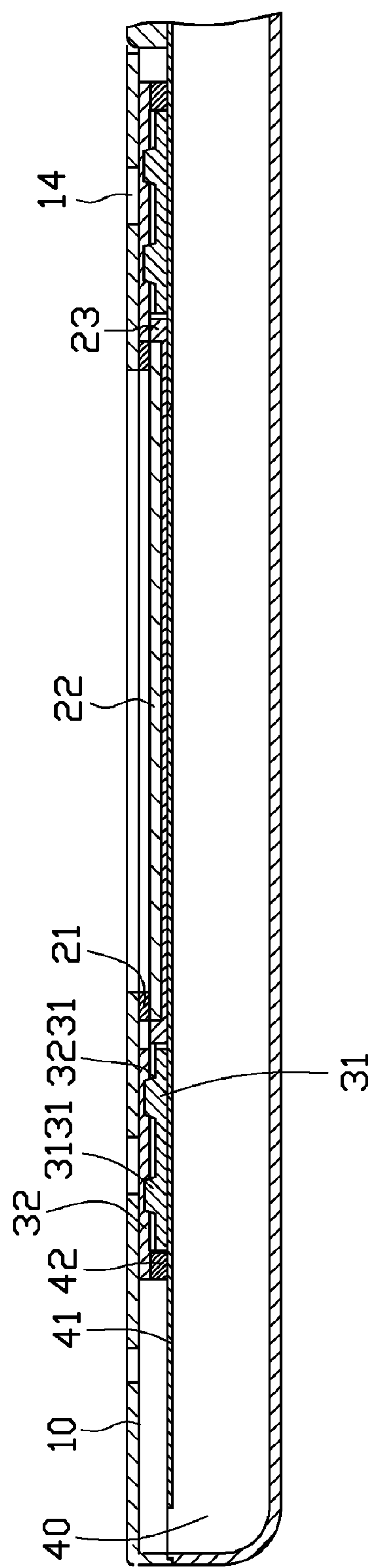
FIG. 5 is a partially, cross sectional view of the portable electronic device shown in FIG. 4.

In assembly of the portable electronic device 100, referring to FIGS. 4-5, the light guide plate 31 is fixed on the printed circuit board 41, and the light sources 42 are correspondingly engaged in the cutouts 314. The transparent film 32 is then attached to the light guide plate 31. The protrusions 3131, 3132 correspondingly and partially received in the grooves 3231, 3232, and the space 3133 between the optical surface 311 and the flat surface 321 allows light emitted from the light sources 42 to pass. The notches 324 correspond to the cutouts 314, and each light source 42 is correspondingly received in a combined space of the corresponding cutout 314 and the notch 324. The display 22 is fixed on the fixing member 23, and then the fixing member 23 is received in the first and the second through holes 312, 322 of the light guiding module 30. The gasket 21 is set on the inner surface 112 of the cover 10, around the display window 13. Finally, the cover 10 is attached to the main body 40, with the gasket 21 resisting the display 22 and the light transmitting region corresponding to the reflecting region 313.

When the light sources 42 emit light, light travels through the light reflecting region 313 of the light guide plate 31. The light partially reaches the light reflecting region 313 of the light guide plate 31, and is repeatedly reflected by the protrusions 3131 and the gasket 21. Since the size of the space 3132 uniformly decreases with increasing distance from the first through hole 322, reflecting times of the light increase with increasing distance from the light sources 42. Thus, the time of the light staying in the space 3133 increases with increasing distance from the light sources 42, which increases the light intensity. This balances the decrease of light intensity due to a distance from the light sources 42. As a result, the light intensity of the light reflecting region 313 is more uniform, and light uniformly travels out from the apertures 14 after passing the transparent film 32.

It is to be understood that the transparent film may be omitted, and the protrusions 3131, 3132 directly resist the cover 10.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light guiding mechanism for portable electronic device comprising:

a cover including a light transmitting region;

a light guiding module including a light guide plate having a first diagonal line and a second diagonal line, the light guide plate defining a first through hole; the light guide plate including a light reflecting region around the first through hole, the light reflecting region disposed beneath the light transmitting region of the cover; the light reflecting region including a plurality of protrusions symmetrically positioned relative to the first diagonal line and the second diagonal line; adjacent protrusions having a space therebetween, the size of the space uniformly increasing with increasing distance from the first through hole; and four light sources correspondingly adjacent to four sides of the light guide plate, light emitted from the light sources being repeatedly reflected by the protrusions and then passing the light transmitting region of the cover.

2. The light guiding mechanism as claimed in claim 1, wherein the light guiding module further comprises a transparent film, the transparent film attached to the light guide plate, and the transparent film defining a plurality of grooves for partially receiving the protrusions correspondingly.

3. The light guiding mechanism as claimed in claim 2, wherein the light guide plate defines four cutouts at edges thereof, the transparent film defines four notches corresponding to the cutouts, and each of the light sources is received in a combination space of the cutout and the corresponding notch.

4. The light guiding mechanism as claimed in claim 3, wherein each pair of the adjacent protrusions has a pair of parallel edges facing each other.

5. The light guiding mechanism as claimed in claim 4, wherein the protrusions includes first protrusions and second protrusions, the first protrusions are hexagonal having three pairs of parallel edges, and the second protrusions lie on the first diagonal line and the second diagonal line.

6. The light guiding mechanism as claimed in claim 1, further comprising a printed circuit board, wherein the light sources are fixed on the printed circuit board, and the light guiding module is attached to the printed circuit board.

7. The light guiding mechanism as claimed in claim 1, further comprising a display module, wherein the light guiding module defines a through hole, and the display module is received in the through hole.

8. The light guiding mechanism as claimed in claim 7, wherein the display module comprises a gasket, a display and a fixing member, the display is fixed to the fixing member, and the gasket is between the cover and the gasket.

9. The light guiding mechanism as claimed in claim 8, wherein the cover defines a display window corresponding to the display, the light transmitting region including a plurality of apertures around the display window.

10. The light guiding mechanism as claimed in claim 1, wherein the light sources are light emitting diodes.

11. A light guiding mechanism for portable electronic device comprising:

a cover including a light transmitting region;

a light guide plate having a first diagonal line and a second diagonal line and defining a first through hole; the light guide plate including a plurality of protrusions, the protrusions being around the first through hole and symmetrically positioned relative to the first diagonal line and the second diagonal line; the protrusions being beneath the light transmitting region; adjacent protrusions having a space therebetween, the size of the space uniformly increasing with increasing distance from the first through hole; and four light sources correspondingly adjacent to four sides of the light guide plate, light emitted from the light sources being repeatedly reflected by the protrusions and then passing the light transmitting region of the cover.

12. The light guiding mechanism as claimed in claim 11, further comprising a printed circuit board, wherein the light guide plate is attached to the printed circuit board, and the light sources are fixed on the printed circuit board.

13. The light guiding mechanism as claimed in claim 12, further comprising a transparent film attached to the printed circuit board, wherein the transparent film defining a plurality of grooves for partially received the protrusions correspondingly.

14. The light guiding mechanism as claimed in claim 13, wherein the light guide plate defines four cutouts at edges thereof, the transparent film defines four notches corresponding to the cutouts, and each of the light sources is received in a combination space of the cutout and the corresponding notch.

15. The light guiding mechanism as claimed in claim 14, wherein each pair of the adjacent protrusions has a pair of parallel edges facing each other.

16. The light guiding mechanism as claimed in claim 15, wherein the protrusions includes first protrusions and second protrusions, the first protrusions are hexagonal having three pairs of parallel edges, and the second protrusions lie on the first diagonal line and the second diagonal line.

17. The light guiding mechanism as claimed in claim 12, further comprising a display module, wherein the light guiding module defines a through hole, and the display module is received in the through hole.

18. The light guiding mechanism as claimed in claim 17, wherein the display module comprises a gasket, a display and a fixing member, the display is fixed to the fixing member, and the gasket is between the cover and the gasket.

19. The light guiding mechanism as claimed in claim 16, wherein the cover defines a display window corresponding to the display, the light transmitting region including a plurality of apertures around the display window.

20. The light guiding mechanism as claimed in claim 12, wherein the light sources are light emitting diodes.

* * * * *

UNITED STATES PATENT AND TRADEMARK OFFICE

CERTIFICATE OF CORRECTION

PATENT NO. : 8,277,061 B2
APPLICATION NO. : 12/750837
DATED : October 2, 2012
INVENTOR(S) : Mu-Wen Yang et al.

It is certified that error appears in the above-identified patent and that said Letters Patent is hereby corrected as shown below:

On the title page, please insert Item (30) regarding "Foreign Application Priority Data" with the following:

-- (30) Foreign Application Priority Data

May 5, 2009 (CN) ............................200910302102.8 --

Signed and Sealed this
Twenty-ninth Day of October, 2013

Teresa Stanek Rea
*Deputy Director of the United States Patent and Trademark Office*